July 12, 1927.
I. CUMMINGS
1,635,820
WATER POWER UTILITY
Filed Dec. 7, 1925 3 Sheets-Sheet 1
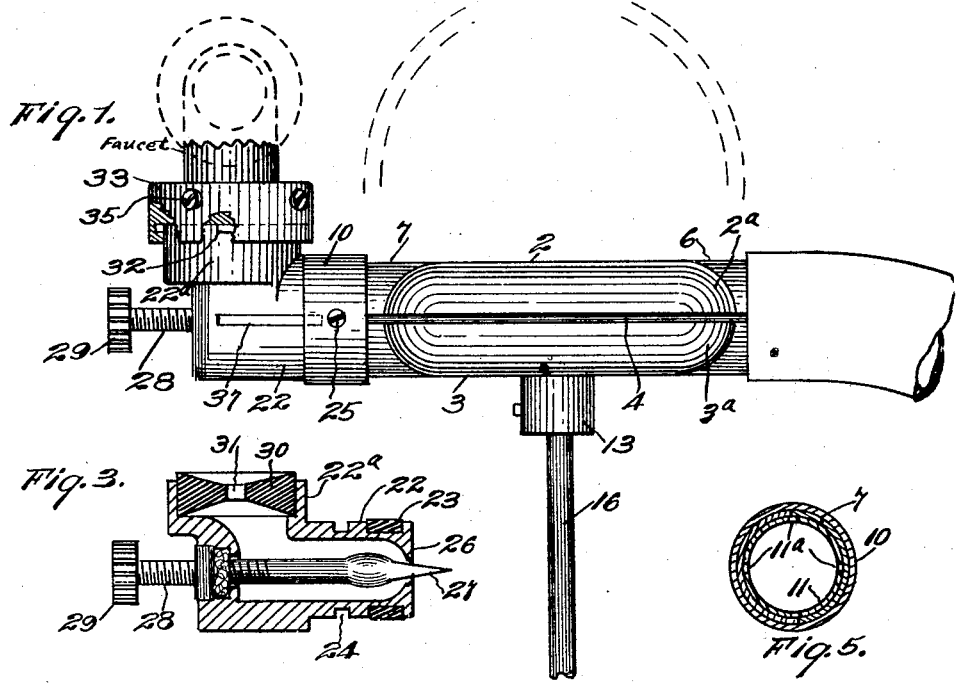
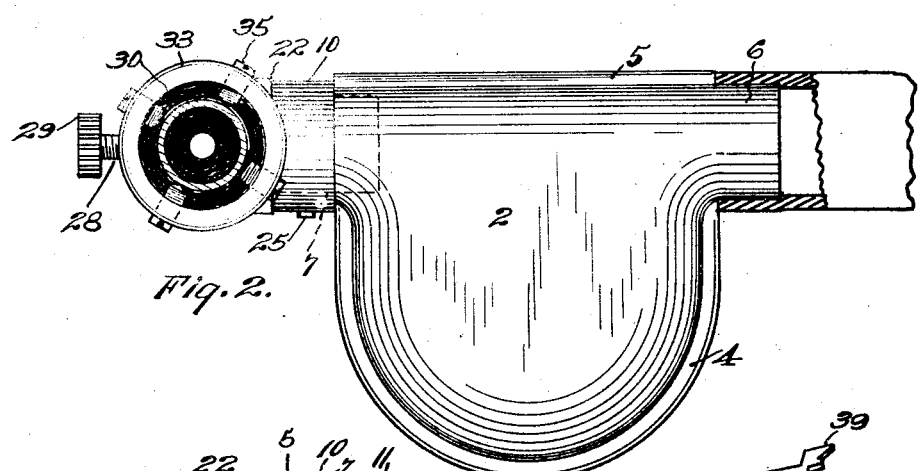
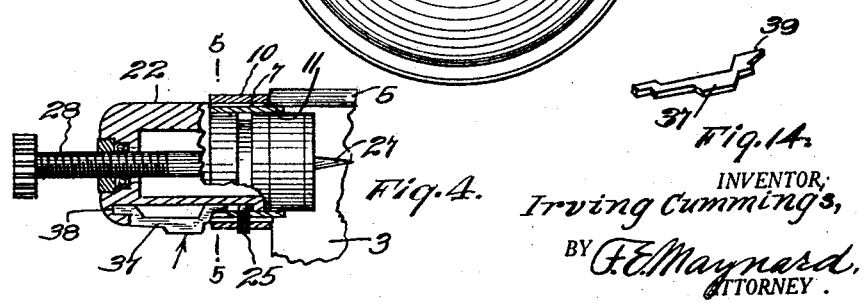
INVENTOR.
Irving Cummings,
BY G.E. Maynard,
ATTORNEY.

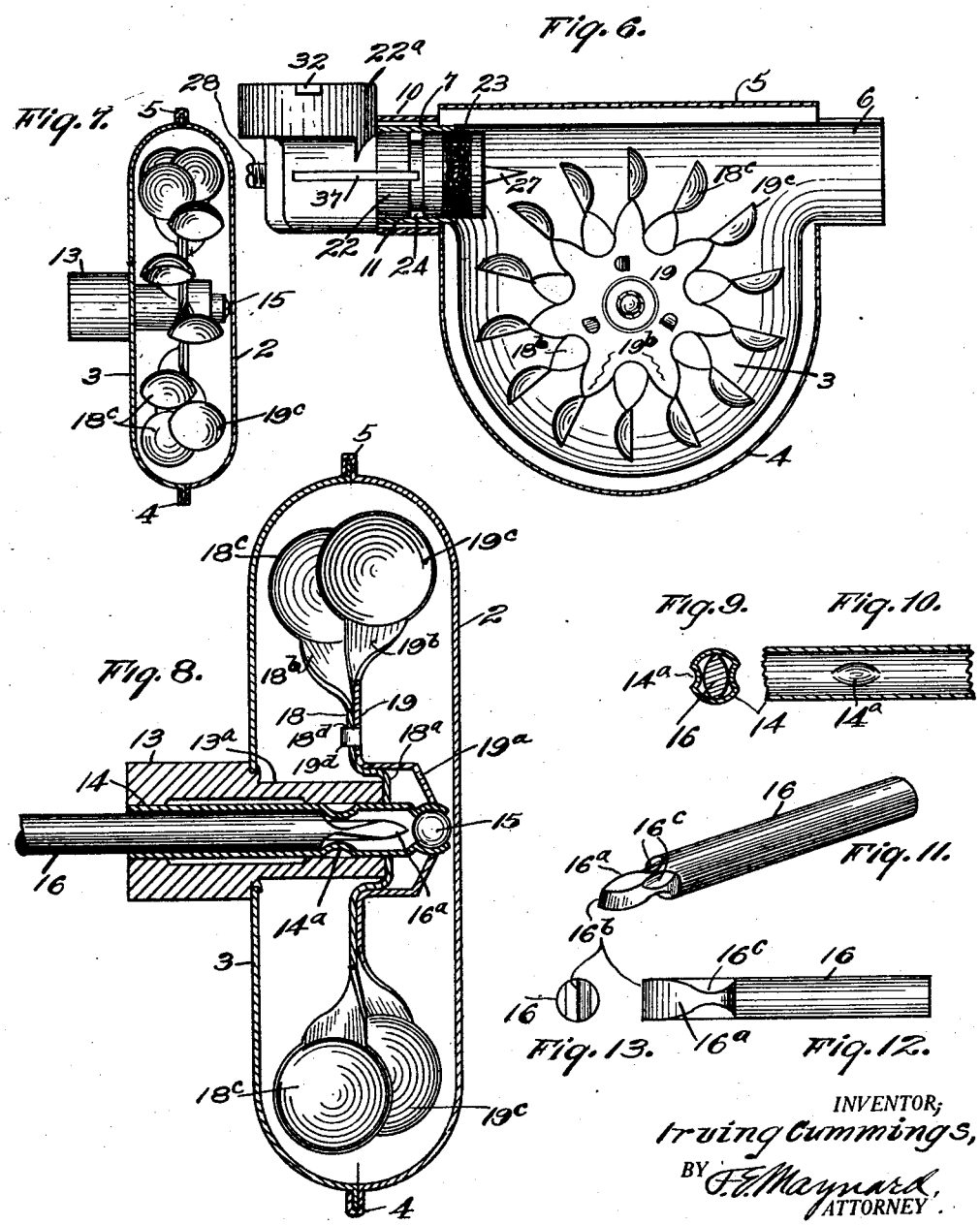

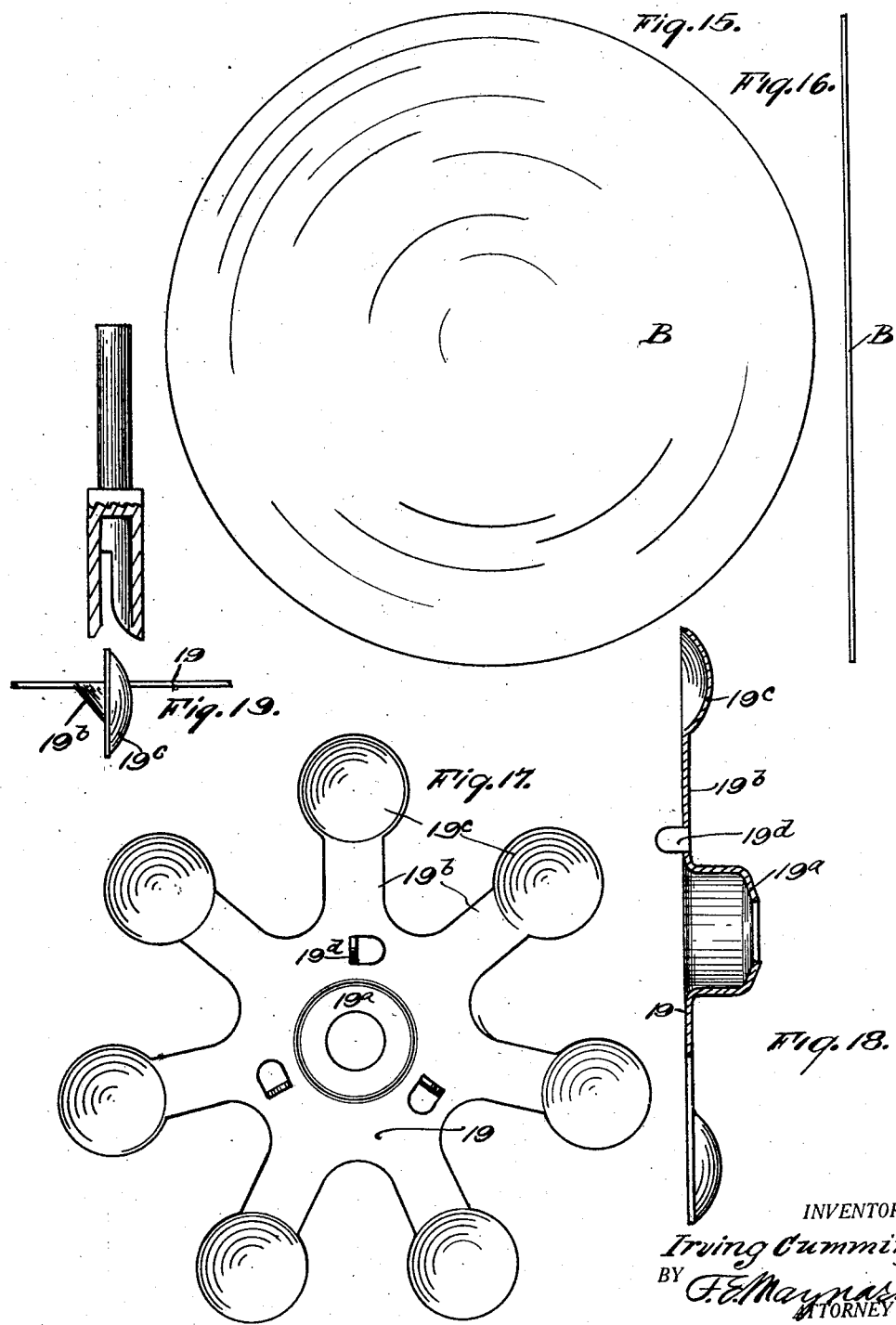

Patented July 12, 1927.

1,635,820

UNITED STATES PATENT OFFICE.

IRVING CUMMINGS, OF LOS ANGELES, CALIFORNIA.

WATER-POWER UTILITY.

Application filed December 7, 1925. Serial No. 73,741.

This invention relates to motors and more especially to water turbines.

An object is to provide an improved wheel structure by increment of efficiency, lightness in weight combined with ruggedness, and novel details in arrangement and form of the impact buckets, and in itself contained bearing parts.

Another object is to accomplish ease of assembly and compactness of the entire motor embodiment.

And an object is to provide a motor of small size and relatively great power, capable of being readily and compactly stored in a traveller's luggage and when desired easily and very quickly attached to any water faucet to utilize water as a source of power for driving various appliances, such as vibrators, and polishers, mixers and beaters with but a surprisingly small water consumption.

An object is to provide for the ready variation of power and speed according to the nature of the implement to be driven.

A further object is to provide various angular and positional adjustments of the motor bodily with respect to the fixed faucet or other source of water supply.

Another object is to provide a motor having a two-part mounting means, one to be rigidly attached to the faucet and left installed for a desired period and the other forming a part of the motor and instantly attachable to and detachable from the fixed or installed part on the faucet.

Other objects and advantages will be made manifest in the following specification of apparatus of one embodiment of the invention illustrated herewith; it being understood that variations, modifications and adaptations may be resorted to within the spirit and scope of the invention.

Figure 1 is an edge view of the motor as applied in a horizontal plane to the nozzle of a faucet. Figure 2 is a plan of the motor. Figure 3 is a central section of the motor mount and water-nozzle. Figure 4 is a partial section of the water-nozzle, showing a position latch. Figure 5 is a cross section on line 5—5 of Fig. 4. Figure 6 is a central section between the front and back of the motor. Figure 7 is a diametrical section of the motor. Figure 8 is an enlarged constructional section axially of the motor. Figure 9 is a cross-section of the rotor shaft-socket and shaft. Figure 10 is a longitudinal section of a portion of the shaft-socket. Figure 11 is a perspective of the detachable rotor shaft. Figure 12 is a side elevation of the shaft and Figure 13 is an end view thereof. Figure 14 is a perspective of the motor latch. Figs. 15 and 16 show a disc blank. Fig. 17 is a plan of the disc before the buckets are twisted. Fig. 18 is a section of Fig. 17. Fig. 19 shows the bucket twisting step.

In its illustrated form the turbine has a shell comprising essentially but two parts, a front 2 and a back 3 of generally semicircular outline and having quarter-round, meeting rims 2ª—3ª which are provided with an overturned seam 4. The shell has a tangent side seam 5 beyond the ends of which extend tubular, cylindical nipples 6 and 7 whose radii are the same as that of the rims.

Around the nipple 7 is secured a band 10 shouldering against the near end of the seam 5, and inside the nipple 7 is a somewhat longer bushing 11, the latter and nipple 7 and the band terminating flush at the outer end. The bushing 11 has a series of notches 11ª at its outer end.

In the back 3 there is rigidly mounted a stout bearing having an outer part 13 and a reduced inwardly projecting horn 13ª terminating well in from the front wall 2. Well fitting and running in the bearing is a sleeve or socket 14 flush with the outer end of bearing 13 and projecting beyond the inner end thereof and carrying an antifriction ball 15 barely but not necessarily touching the resilient, front shell 2. The socket has substantial, horizontally extending, elliptical indentures 14ª in opposite sides which are spaced to receive the flat sided nose 16ª of a stem or shaft 16 removably and slidably fitting in the socket. The nose 16ª is wedge pointed at 16ᵇ so as to readily nose past the outer end of the interposed indentures 14ª, but the diameter of the nose is greater than the distance between the indentures so that the socket rotates the shaft.

To effect an inward reaction on the inserted shaft by the driving nogs or indentures, the nose shank is beveled off at 16ᶜ toward the center of the top and bottom giving a reduced "waist" portion back from the wedge 16ᵇ. Hence when the socket is rotating its indentures readily ride into the deepest portions of the incurves 16ᶜ and so tend to interlock with the inserted shaft.

On the shaft socket 14 is rigidly secured a turbine wheel here comprised of connected twin-like discs 18—19; the first having an embossed hub 18ª receiving and operatively touching the horn end of the bearing part 13ª. Disc 19 has a hollow hub 19ª fitted on hub 18ª. As clearly shown in Figure 6, the discs 18—19 have radial, flat arms 18ᵇ—19ᵇ quarter turn twisted and having on their extremities hemispherical buckets 18ᶜ—19ᶜ. The buckets are all symmetrically disposed and those of one disc are interposed between those of the other disc.

An object of my present improvement is to obtain the impact of the full cross-section of a stream of water projected into the shell tangentially to the bucket series and an object is to throw the impinging water centrally and reduce the amount deflected laterally so that side wall clearance may be reduced without increasing dead water resistance.

To that objective, I provide hemispherical buckets which are laterally offset as to the plane of their disc and which discs have their buckets offset in a direction opposite to that of the other. In other words, the right-hand disc has its bucket series offset to the right of its plane and the left hand disc has its bucket series contrawise. Each bucket has an inner side portion extending across the plane of the discs a distance sufficient to intercept the whole cross-section of the stream of impelling water projected in a line tangent to the center or pitch line of the bucket series (note Figure 6). The concave faces of the buckets are presented to the stream and instead of the water of the stream being split and thrown laterally in reversion of flight and crowding against the side of walls and choking the impeller it is diverted by the palm of the bucket inwardly or centrally, thus quickly clearing the bucket impacted. The buckets are successively staggered.

The rotor has practically no side play and is therefore noiseless.

The nipple 7 contains a water-nozzle which is coaxial with the nipple 6 which forms the outlet side of the motor.

The water-nozzle consists of a hollow plug or casing 22 having a countersunk gasket 23 tightly but turnably fitting the bushing 11. The plug is grooved peripherally at 24 to receive a key screw 25 holding it only against axial movement. On the inner end of the plug is a centrally orificed end wall 26 and in this is a needle valve 27 whose threaded shank 28 passes out through the outer end of the plug body and has a thumb head 29 by which the screw may be turned to change the volume of flow past the needle 27 and thereby the power and speed of the turbine wheel, and water consumption.

It is desirable to enable the motor to be applied readily to faucets and water outlets of various shapes and sizes, and also provide for bodily swinging the motor orbitally around the faucet end as may be desired, and further, to provide for swinging the motor bodily on the axis of the needle valve to permit of the use of the motor shaft, as needed, at different angles from vertical to horizontal while attached to the faucet. Therefore, the plug or valve body 22 has a laterally opening cup 22ª containing a thick, double concave washer 30 having a rather small portway 31. On opposite sides of the cup edge are lugs 32 and these pass into and interlock in an internally slotted adapter ring 33 telescoping over the cup and seating on the gasket 30. The adapter may be slipped up around the faucet mouth and secured firmly. Quick detachment of the motor from the mounted adapter may be accomplished by merely swinging the motor around the faucet until the lugs 32 are disengaged from the channelled ring fastened to the faucet. To attach the adapter to the faucets of various sizes, set screws 35 are disposed radially in the ring and these may be screwed in to firmly attach the adapter in a position in which the gasket is firmly jammed up against the faucet mouth.

When the water is turned on it backs up in the needle valve casing or plug and since the area of the lower side of the gasket presented to water pressure is greater than the area at the mouth of the faucet it will be seen that the gasket is bowed up against the lip of the faucet and leak prevented.

Any suitable means may be employed to fasten the motor body in different angular adjustments while its supporting plug is attached to the faucet. In the present case the plug has a small counter-sunk, resilient latch 37 interhooked in a recess 38 and having an outwardly springing dog-end 39, (Fig. 14) snapping into the notches 11ª in the motor bushing 11. Figure 4 shows the latch 37 pressed in to release the motor body so that it may be turned on the plug 22 to another desired position.

An object of the invention is to provide a method for making the turbine wheel. By my method a blank disc B of suitable material, as brass, is first cut, then this is stamped to form the arms as 19ᵇ, with the buckets 19ᶜ and to punch out the shaft hole and form lugs 19ᵈ (or cut apertures 18ᵈ in disc 18 when this is the piece being formed). Either with or subsequent to these operations the hub of the disc is drawn and the buckets are also drawn. When the drawing steps have been completed, the piece is trimmed. After the trimming is finished the piece is subjected to action of means whereby the buckets are turned from the plane of the disc to an angle of 90 degrees thereto and at the same time the buckets are given the desired lateral offset from the plane of the disc. Then a disc 19 with lugs 19$^d$ is laid against a disc 18 and the lugs 19$^d$ are clinched down after being passed through the perforations 18$^d$.

The above method produces a turbine wheel which cannot be made as a casting with any degree of economy, if at all.

The invention claimed is:

1. A device of the class described, having a shell with an intake nipple, a mounting plug on which the nipple is rotatively journaled, means connecting the nipple and the plug against end movement, and a positive latching device mounted on one of said parts and operative to lock them relatively at predetermined positions.

2. In a device of the class described, a mounting ring for attachment to a faucet spout and having set screws to fix it in place, the bore of the ring having a circular groove with lateral entrances in the near end of the ring, and a bearing member, for a motor shell, having a part turnably fit in the ring and having external lugs to interlock in the said groove and permit ready attachment and detachment of the bearing member to and from the ring by a partial turn of the member without removing the ring from the faucet.

3. In a motor of the class described, a mounting ring for attachment to a faucet spout and means for fixing it in place thereon, said ring having an interrupted internal bore-surface groove, a bearing member to turnably fit in the ring bore and having external lugs to interengage in the said groove to detachably connect and disconnect the parts by a partial turn, and a gasket in the top end of said part and which is compressible against the rim of the mouth of the faucet when the bearing member is interengaged with the ring.

4. A device of the class described, having a shell with an intake nipple, a mounting plug extending into and on which the nipple is rotatively journaled, means to prevent end movement of the shell on the plug, and a latch in the plug for locking the shell against rotation.

5. A device of the class described, including a motor shell for a wheel and having an inlet nipple tangent to the wheel, and a mounting element engaging the nipple and connectible with a conduit outlet, and having a valve to vary flow to the wheel.

6. A device of the class described, including a motor shell for a wheel and having an inlet nipple tangent to the wheel, and a mounting element engaging the nipple and connectible with a conduit outlet, and having a valve to vary flow to the wheel; said element having a lateral gasket cup and a gasket therein to jam against the end of the conduit outlet.

IRVING CUMMINGS.